(12) United States Patent
Xue et al.

(10) Patent No.: US 10,560,550 B1
(45) Date of Patent: Feb. 11, 2020

(54) AUTOMATIC CONFIGURATION OF A REPLACEMENT NETWORK DEVICE IN A HIGH-AVAILABILITY CLUSTER

(71) Applicant: Juniper Networks, Inc., Sunnyvale, CA (US)

(72) Inventors: Qilin Xue, Fremont, CA (US); Weibin Chen, Milpitas, CA (US); Subbiah Kandasamy, Fremont, CA (US); Weimin Ji, San Jose, CA (US); Zheng Chang, Beijing (CN)

(73) Assignee: Juniper Networks, Inc., Sunnyvale, CA (US)

( * ) Notice: Subject to any disclaimer, the term of this patent is extended or adjusted under 35 U.S.C. 154(b) by 374 days.

(21) Appl. No.: 15/483,542

(22) Filed: Apr. 10, 2017

(51) Int. Cl.
*H04L 29/08* (2006.01)
*H04L 12/24* (2006.01)
*H04L 12/26* (2006.01)

(52) U.S. Cl.
CPC .......... *H04L 67/34* (2013.01); *H04L 41/0663* (2013.01); *H04L 41/0668* (2013.01); *H04L 41/0866* (2013.01); *H04L 43/10* (2013.01); *H04L 67/10* (2013.01); *H04L 67/141* (2013.01)

(58) Field of Classification Search
CPC ............. H04L 41/0663; H04L 41/0668; H04L 41/0866; H04L 43/10; H04L 67/10; H04L 67/141; H04L 67/34
See application file for complete search history.

(56) References Cited

U.S. PATENT DOCUMENTS

| 7,039,694 | B2* | 5/2006 | Kampe ............... H04L 41/0618 709/216 |
| 7,360,208 | B2 | 4/2008 | Joshi et al. |
| 7,415,553 | B2 | 8/2008 | Nguyen |
| 8,055,735 | B2 | 11/2011 | Krishnappa et al. |
| 8,131,860 | B1* | 3/2012 | Wong ................... G06F 11/2097 370/338 |
| 2002/0049845 | A1 | 4/2002 | Sreenivasan et al. |
| 2006/0294413 | A1* | 12/2006 | Filz .......................... G06F 8/65 714/4.4 |
| 2011/0055364 | A1* | 3/2011 | Heim ................... H04L 41/0806 709/223 |

(Continued)

OTHER PUBLICATIONS

Juniper Networks, "Junos OS Chassis Cluster Feature Guide for Branch SRX Series Devices," http://www.juniper.net/techpubs/en_US/junos12.1x46/information-products/pathway-pages/security/security-chassis-cluster.pdf, Jun. 24, 2016, 408 pages.

*Primary Examiner* — Gil H. Lee
(74) *Attorney, Agent, or Firm* — Harrity & Harrity, LLP (57) ABSTRACT

A first network device may establish connectivity with a second network device. The first network device may determine information that identifies a cluster identifier based on establishing connectivity with the second network device. The first network device may compare a first software version of the first network device and a second software version of the second network device. The first network device may selectively obtain and install a system image of the second network device based on comparing the first software version and the second software version. The first network device may receive, from the second network device, configuration information and user session information based on selectively obtaining the system image. The first network device and the second network device may form a high-availability cluster.

20 Claims, 8 Drawing Sheets

(56) References Cited

U.S. PATENT DOCUMENTS

| | | |
|---|---|---|
| 2011/0299391 A1 | 12/2011 | Vobbilisetty et al. |
| 2014/0086100 A1 | 3/2014 | Keesara et al. |
| 2014/0096121 A1* | 4/2014 | Joshi .................. G06F 8/65 |
| | | 717/170 |
| 2014/0219079 A1 | 8/2014 | Kapadia et al. |
| 2014/0281669 A1* | 9/2014 | DeCusatis ........... G06F 11/2005 |
| | | 714/4.11 |
| 2015/0227318 A1 | 8/2015 | Banka et al. |
| 2016/0028587 A1 | 1/2016 | Garg et al. |

* cited by examiner

AUTOMATIC CONFIGURATION OF A REPLACEMENT NETWORK DEVICE IN A HIGH-AVAILABILITY CLUSTER

BACKGROUND

Modern networks require high-availability. In order to accommodate this requirement, network devices (e.g., routers, switches, firewalls, etc.) can be configured to operate as a cluster, where a pair of network devices operate like a single network device. In this way, the cluster can provide device, interface, and service level redundancy.

SUMMARY

According to some possible implementations, a replacement network device may include one or more processors to establish connectivity with a primary network device. The one or more processors may enable a multicast listener based on establishing connectivity with the primary network device. The one or more processors may receive, from the primary network device, a multicast packet based on enabling the multicast listener. The one or more processors may determine, based on the multicast packet, information that identifies a cluster identifier and a node identifier of the replacement network device. The one or more processors may compare, based on determining the information associated with the cluster identifier and the node identifier, a first software version of the primary network device and a second software version of the replacement network device. The one or more processors may selectively obtain, from the primary network device, information associated with a system image of the primary network device based on comparing the first software version and the second software version. The one or more processors may receive, from the primary network device, configuration information and user session information based on selectively obtaining the information associated with the system image. The replacement network device may provide failover capability based on the configuration information and the user session information.

According to some possible implementations, a non-transitory computer-readable medium may store one or more instructions that, when executed by one or more processors of a replacement network device, cause the one or more processors to establish connectivity with a primary network device. The one or more instructions may cause the one or more processors to determine, based on establishing connectivity with the primary network device, information that identifies a cluster identifier associated with a high-availability chassis cluster. The one or more instructions may cause the one or more processors to obtain, from the primary network device, information associated with a system image of the primary network device. The one or more instructions may cause the one or more processors to install the system image based on obtaining the information associated with the system image. The one or more instructions may cause the one or more processors to receive, from the primary network device, information associated with user sessions after installing the system image. The replacement network device may form the high-availability chassis cluster with the primary network device and provide failover capability based on the information associated with the user sessions.

According to some possible implementations, a method may include establishing, by a first network device, connectivity with a second network device. The method may include determining, by the first network device, information that identifies a cluster identifier based on establishing connectivity with the second network device. The method may include comparing, by the first network device, a first software version of the first network device and a second software version of the second network device based on determining the information that identifies the cluster identifier. The method may include selectively obtaining and installing, by the first network device, a system image of the second network device based on comparing the first software version and the second software version. The method may include receiving, by the first network device and from the second network device, configuration information and user session information based on selectively obtaining the system image. The first network device and the second network device to form a high-availability cluster.

DETAILED DESCRIPTION

The following detailed description of example implementations refers to the accompanying drawings. The same reference numbers in different drawings may identify the same or similar elements.

Networking security systems rely on redundancy protection to ensure service availability and business continuity. For example, a set of network devices (e.g., firewalls, routers, gateways, or the like) may be configured as a high-availability chassis cluster (i.e., a chassis cluster, a cluster, etc.). When configured as a chassis cluster, the set of network devices provide failover capability in the event of system, software, or hardware failure. In the chassis cluster, a first network device acts as a primary network device and a second network device acts as a secondary network device. In situations where the primary network device fails, the secondary network device takes over the processing of network traffic and the performing of tasks that were assigned to the failed primary network device.

Often, configuring and/or replacing network devices associated with a chassis cluster involves manual steps of loading a compatible software image to a replacement network device, creating console access, and assigning the replacement network device with a cluster identifier and a network device identifier. Further, such steps also include synchronizing security configuration data and user session data between the replacement network device and the primary network device, and booting the replacement network device. Often, these steps necessitate skilled operators, and are time-consuming, inefficient, subjective, and error prone.

Implementations described herein enable automatic configuration of a replacement network device associated with a chassis cluster. For example, implementations described herein enable the replacement network device to perform automatic configuration for a chassis cluster with a primary network device based on establishing connectivity with the primary network device. In this way, implementations described herein reduce the need for manual configuration, reduce errors associated with chassis cluster configuration, reduce an amount of time associated with configuring chassis clusters, or the like.

Figure 1A:
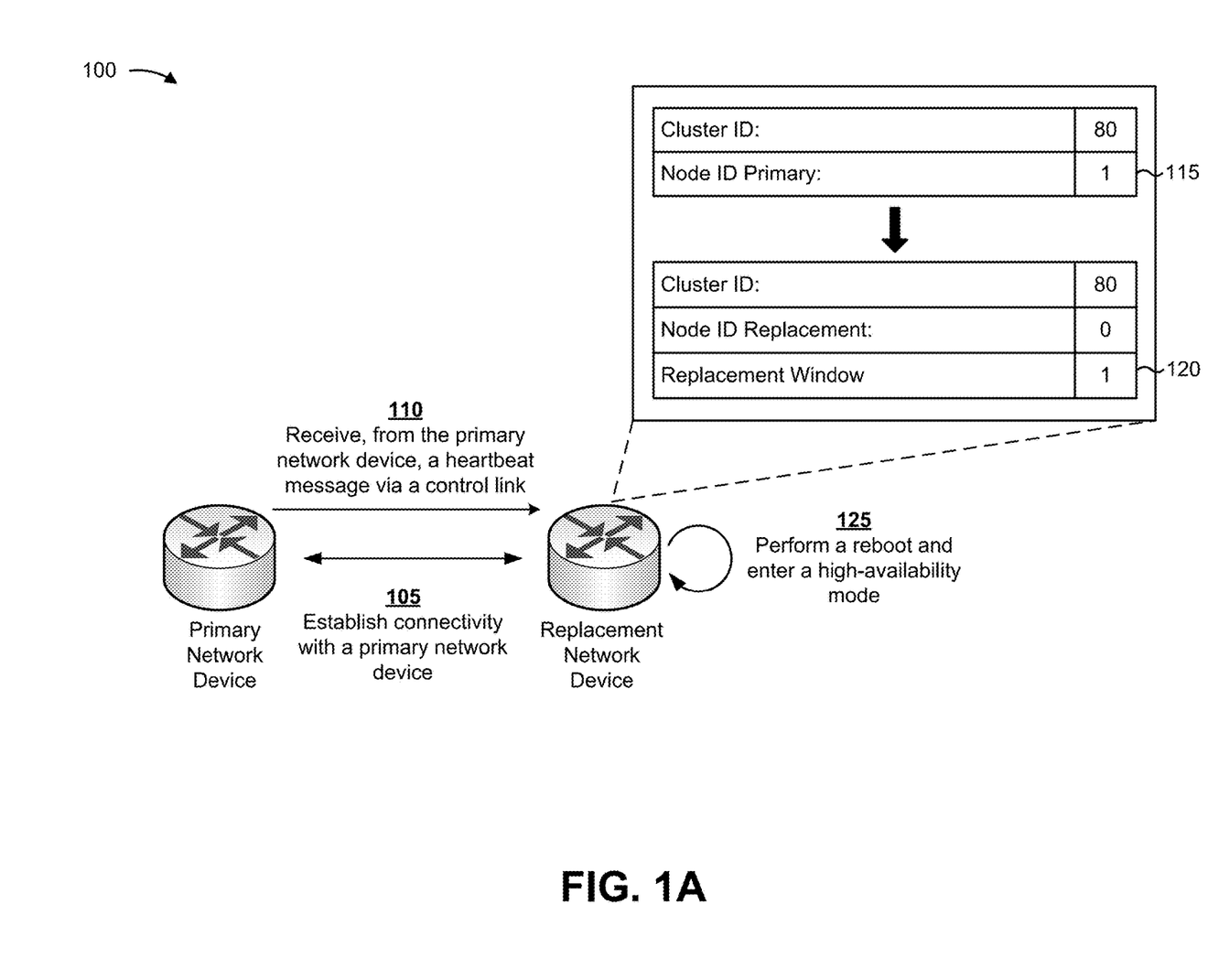
FIGS. 1A-1C are diagrams of an overview of an example implementation described herein.
Figure 1B:
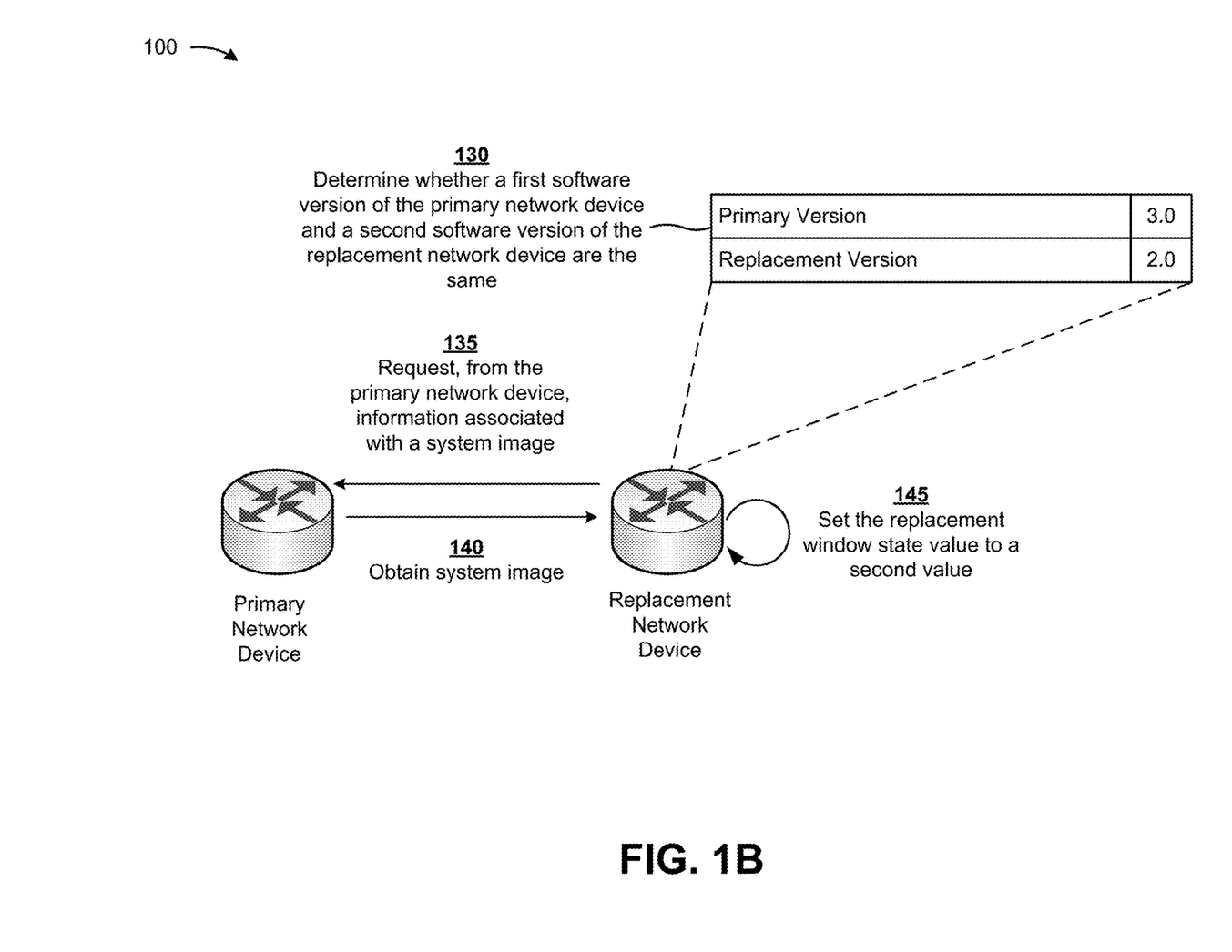
Figure 1C:
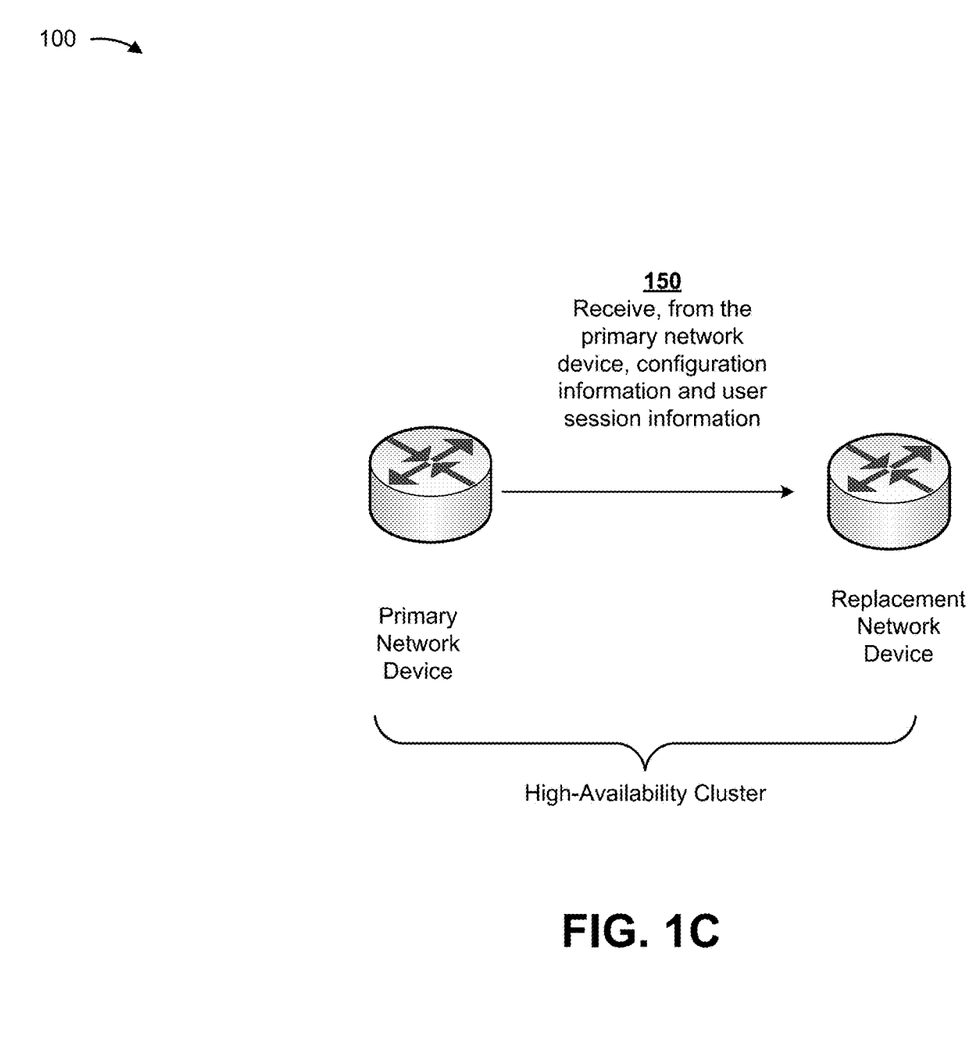

FIGS. 1A-1C are diagrams of an overview of an example implementation 100 described herein. As shown, implementation 100 may include a primary network device and a replacement network device (e.g., a set of firewalls, routers, or the like). As shown in FIG. 1A, and by reference number 105, the replacement network device may establish connectivity with the primary network device. For example, a network operator may connect the primary network device and the replacement network device using a set of networking cables.

As shown by reference number 110, the replacement network device may receive, from the primary network device, a heartbeat message via a control link. The control link may include a link via which the primary network device and the replacement network device may exchange configuration information and/or liveliness information (e.g., heartbeat messages). As shown by reference number 115, the replacement network device may determine, based on the heartbeat message, information that identifies a cluster identifier and a node identifier.

In some implementations, the replacement network device may determine a node identifier of the replacement network device based on the node identifier of the primary network device. For example, a node identifier may include, or be capable of including, a binary value. Thus, in situations where the node identifier of the primary network device is a first value (e.g., 1), then the node identifier of the replacement network device may be a second value (e.g., 0).

As shown by reference number 120, the replacement network device may set a replacement window state value to a first value (e.g., 1). For example, the replacement network device may perform particular actions and/or prevent particular actions from being performed based on a replacement window state value, as described elsewhere herein. That is, the replacement window state value may be indicative as to whether the replacement network device is capable of providing failover capability (e.g., performing tasks that were assigned to the primary network device and/or performing processing of network traffic associated with user sessions).

As shown by reference number 125, the replacement network device may perform a reboot and enter a high-availability mode. For example, the replacement network device may set, in memory, one or more bit values corresponding to the cluster identifier, the node identifier of the replacement network device, and the replacement window state value, and perform a reboot. Upon rebooting, the set bit values may cause the replacement network device to enter a high-availability mode, whereby the replacement network device performs a set of procedures to become capable of providing failover capability.

As shown in FIG. 1B, and by reference number 130, the replacement network device may determine whether a first software version of the primary network device and a second software version of the replacement network device are the same. As shown, assume that the software versions are different. As shown by reference number 135, the replacement network device may request, from the primary network device, information associated with a system image. As shown by reference number 140, the replacement network device may obtain the system image from the primary network device based on the request. In this way, the replacement network device may install the system image, and thereby include a same operating system version as the primary network device.

As shown by reference number 145, the replacement network device may set the replacement window state value to a second value. For example, the replacement window state value that includes the second value may be indicative of the replacement network device being capable of synchronizing configuration information and user session information with the primary network device, as described below.

As shown in FIG. 1C, and by reference number 150, the replacement network device may receive configuration information and user session information from the primary network device. For example, the replacement network device may receive configuration information, such as firewall policy information, routing protocol information, route information, data packet metrics, or the like. Additionally, or alternatively, the primary network device may provide, to the replacement network device, real-time object messages that include user session information. For example, user session information may include information associated with a flow (e.g., a sequence of packets that share common information) and an action associated with the flow (e.g., allow, deny, quarantine, log, or the like).

In this way, and in the event of a failure of the primary network device, the replacement network device may provide failover capability, such as by performing tasks that were assigned to the primary network device and performing processing of network traffic associated with user sessions.

As indicated above, FIGS. 1A-1C are provided merely as an example. Other examples are possible and may differ from what was described with regard to FIGS. 1A-1C.

Figure 2:
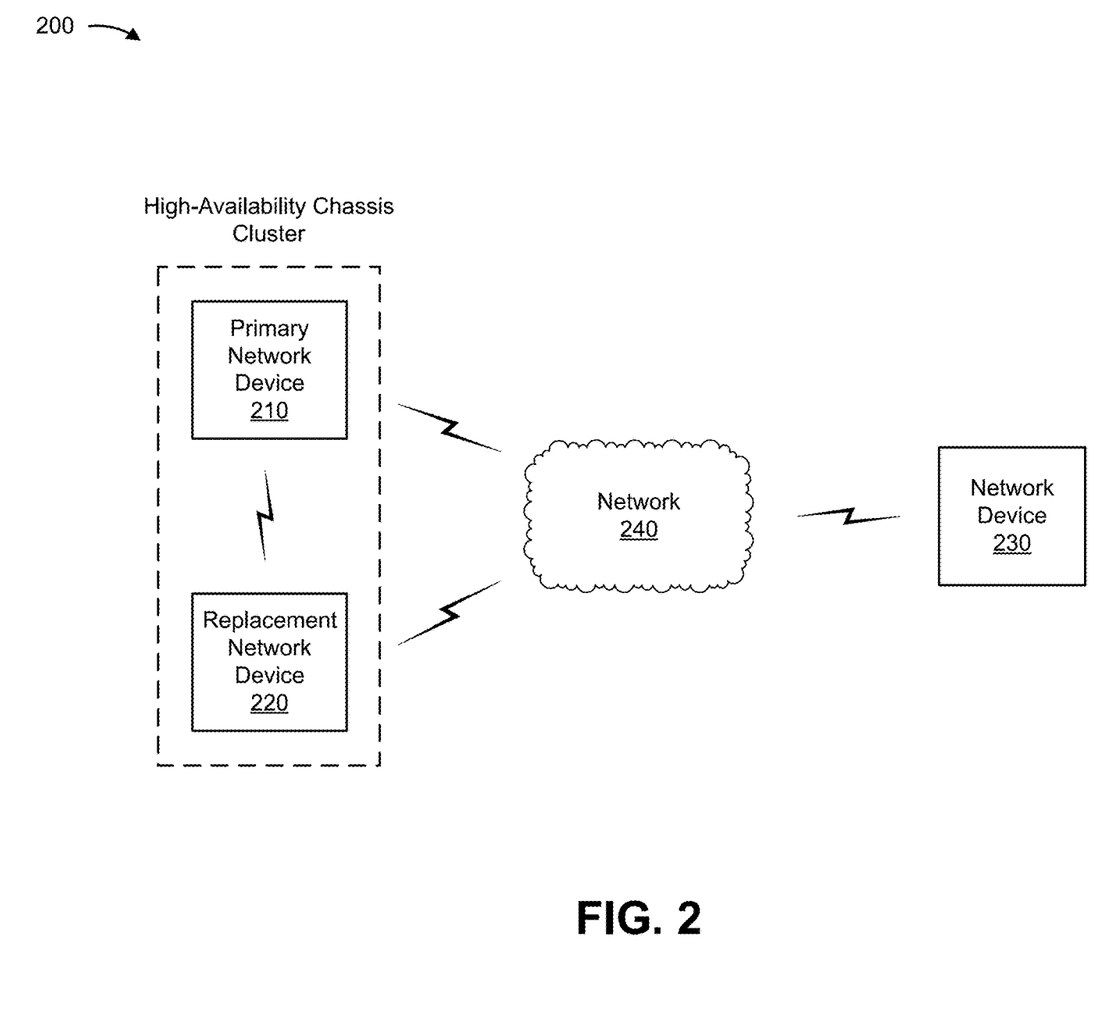
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a primary network device 210, a replacement network device 220, a network device 230, and a network 240. Devices of environment 200 may interconnect via wired connections, wireless connections, or a combination of wired and wireless connections.

Primary network device 210 includes a device (e.g., a traffic transfer device) capable of processing and transferring network traffic (e.g., packets). For example, primary network device 210 may include a router, a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device.

Replacement network device 220 includes a device capable of processing and transferring network traffic. For example, replacement network device 220 may include a router, a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device.

In some implementations, primary network device 210 and replacement network device 220 may form a high-availability chassis cluster. As used herein, a high-availability chassis cluster may be referred to as a cluster, a chassis cluster, or the like, and may refer to a set of network devices that are capable of communicating to collectively perform one or more networking tasks and/or provide high-availability of a service (e.g., a network service). In some implementations, primary network device 210 may actively perform particular tasks associated with the cluster, whereas replacement network device 220 may provide failover in the event of a failure of primary network device 210. While implementations herein describe the operation of a cluster including a particular number of devices (e.g., a single primary network device 210 and a single replacement network device 220), it should be understood that other implementations include clusters that include a greater number of devices.

As used herein, a packet may refer to a communication structure for communicating information, such as a protocol data unit (PDU), a network packet, a datagram, a segment, a block, a cell, a frame, a subframe, a slot, a symbol, a portion of any of the above, and/or another type of formatted or unformatted unit of data capable of being transmitted via a network. As used herein, a flow may refer to a sequence of packets that share common information, such as five-tuple information (e.g., a source address, a destination address, a source port identifier, a destination port identifier, and a protocol identifier).

Network device 230 includes a device capable of processing and transferring network traffic. For example, network device 230 may include a router, a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device. In some implementations, primary network device 210 and/or replacement network device 220 may provide, to network device 230, network traffic via network 240.

Network 240 includes one or more wired and/or wireless networks. For example, network 240 may include a cellular network (e.g., a fifth generation (5G) network, a long-term evolution (LTE) network, a code division multiple access (CDMA) network, a third generation (3G) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
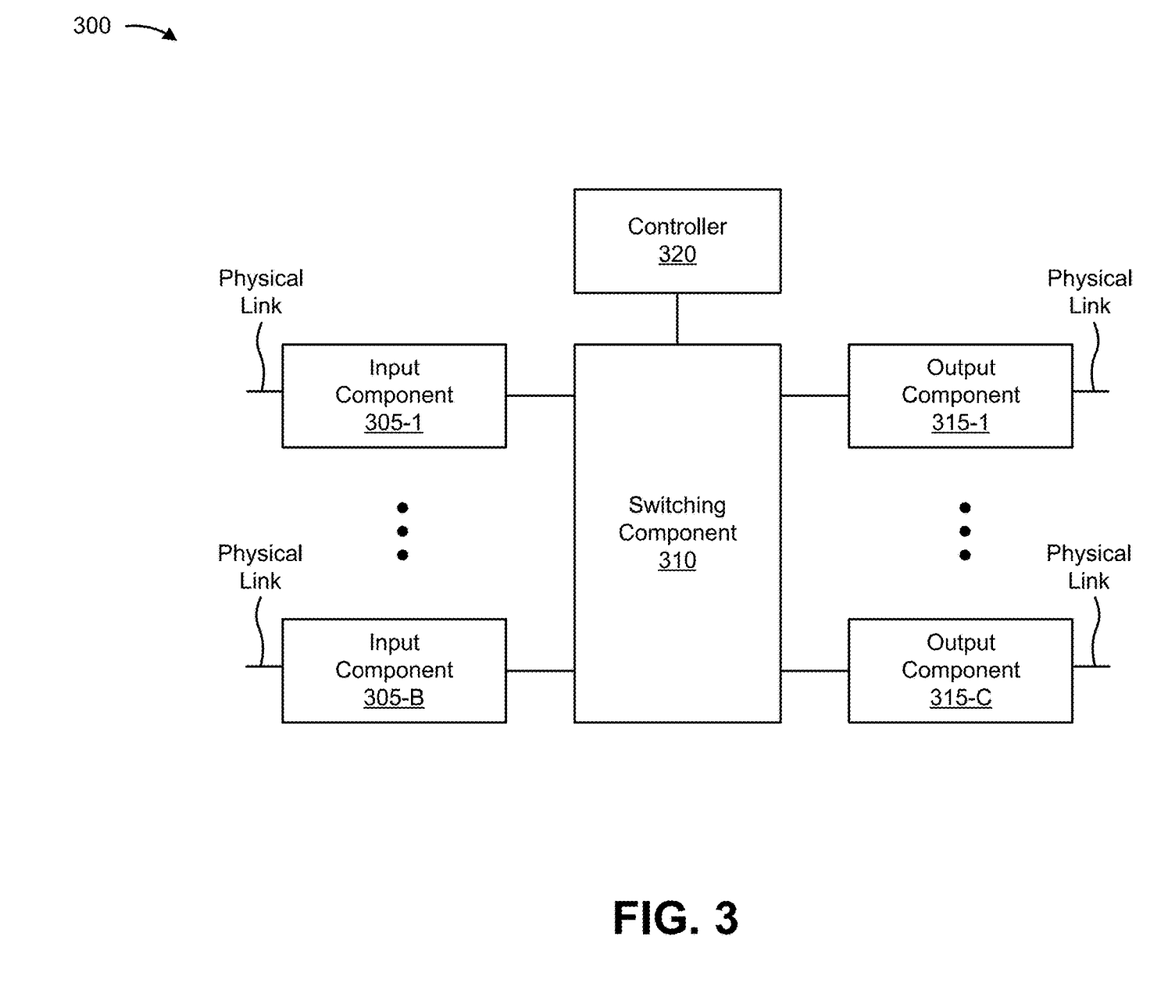
FIG. 3 is a diagram of example components of one or more devices of FIG. 2.

FIG. 3 is a diagram of example components of a device 300. Device 300 may correspond to primary network device 210, replacement network device 220, and/or network device 230. In some implementations, primary network device 210, replacement network device 220, and/or network device 230 may include one or more devices 300 and/or one or more components of device 300. As shown in FIG. 3, device 300 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor is implemented in hardware, firmware, or a combination of hardware and software. In some implementations, controller 320 may include one or more processors that can be programmed to perform a function. In some implementations, controller 330 may include one or more virtual devices that each includes one or more processors.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4A:
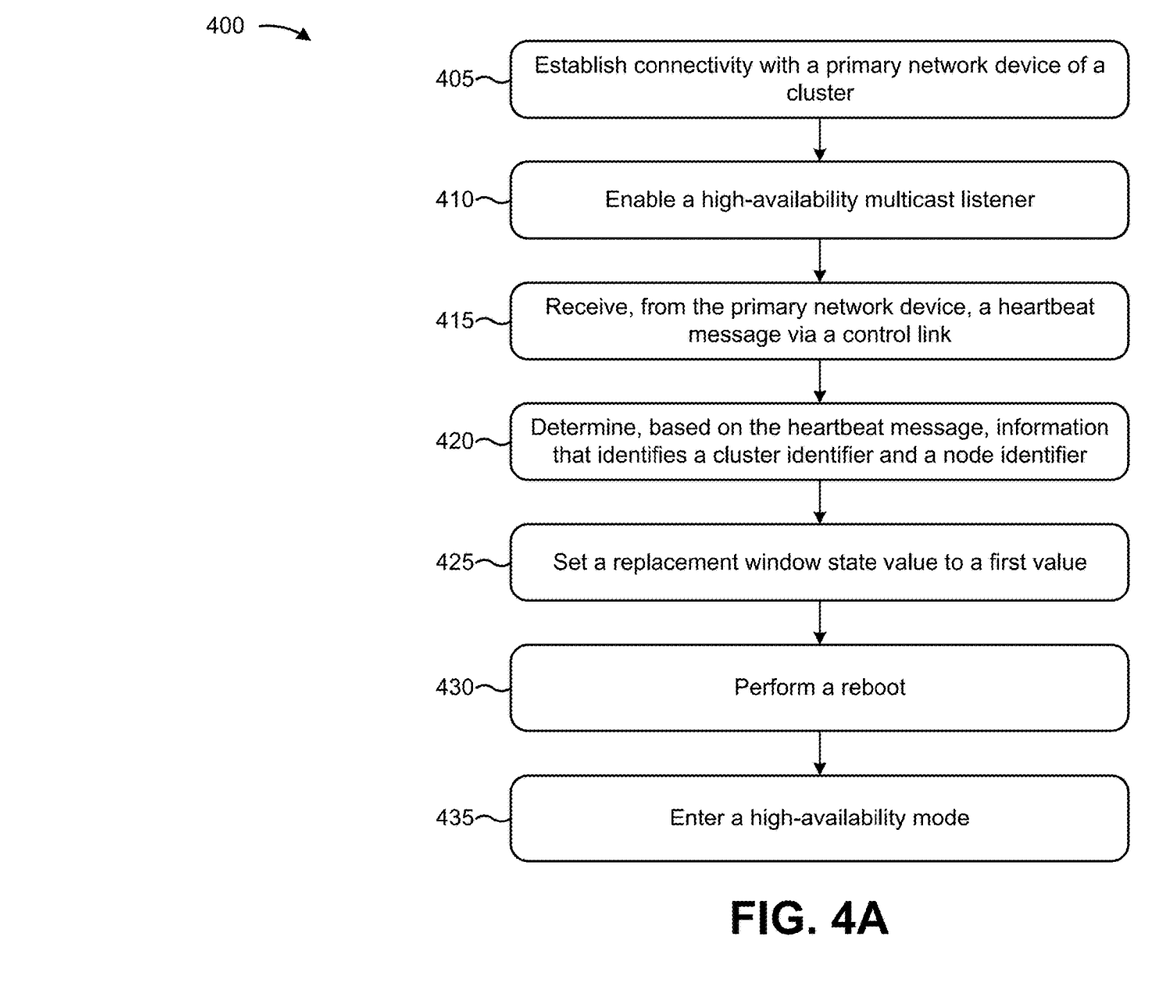
FIGS. 4A-4C are flow charts of an example process for automatically configuring a replacement network device in a high-availability chassis cluster.
Figure 4B:
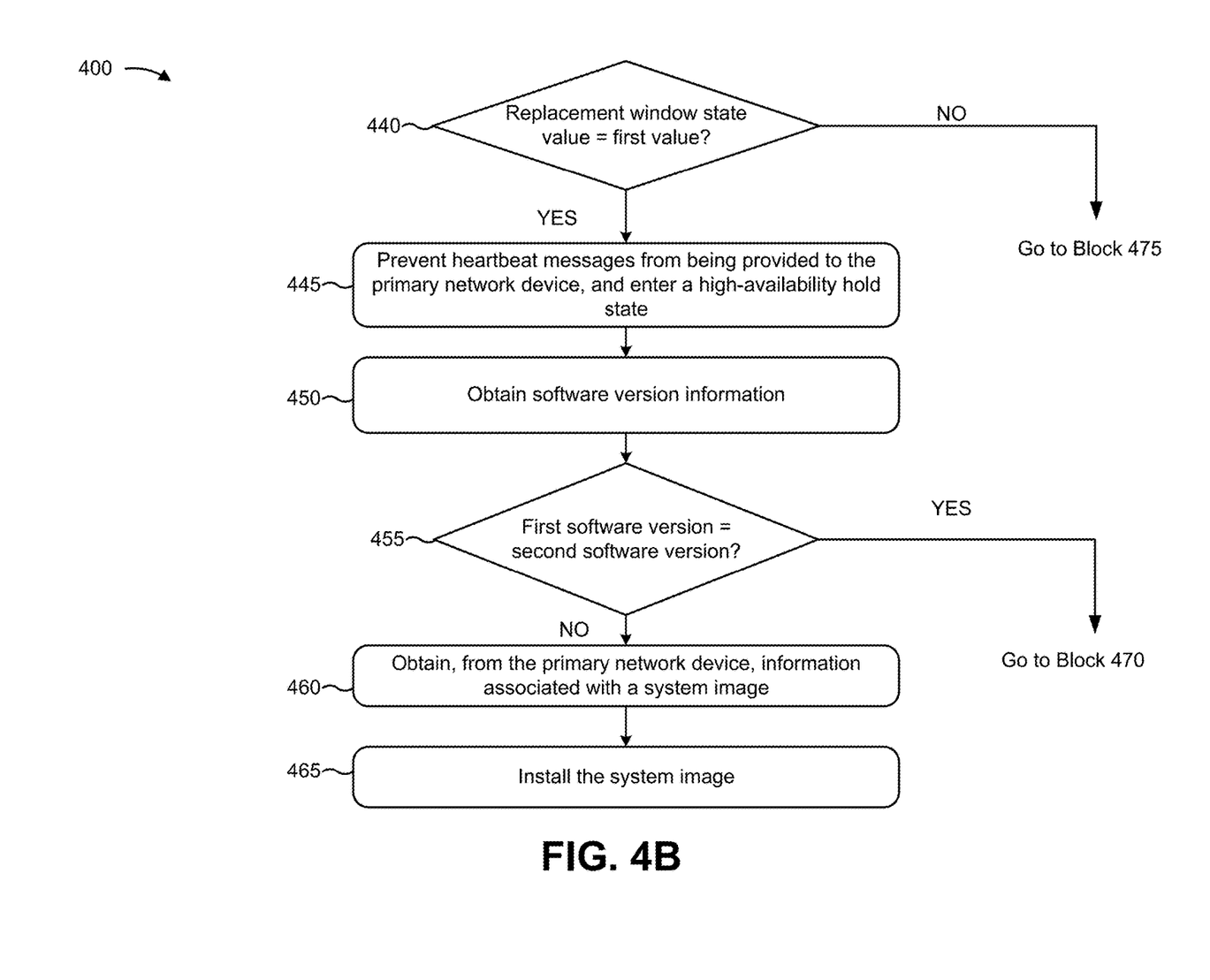
Figure 4C:
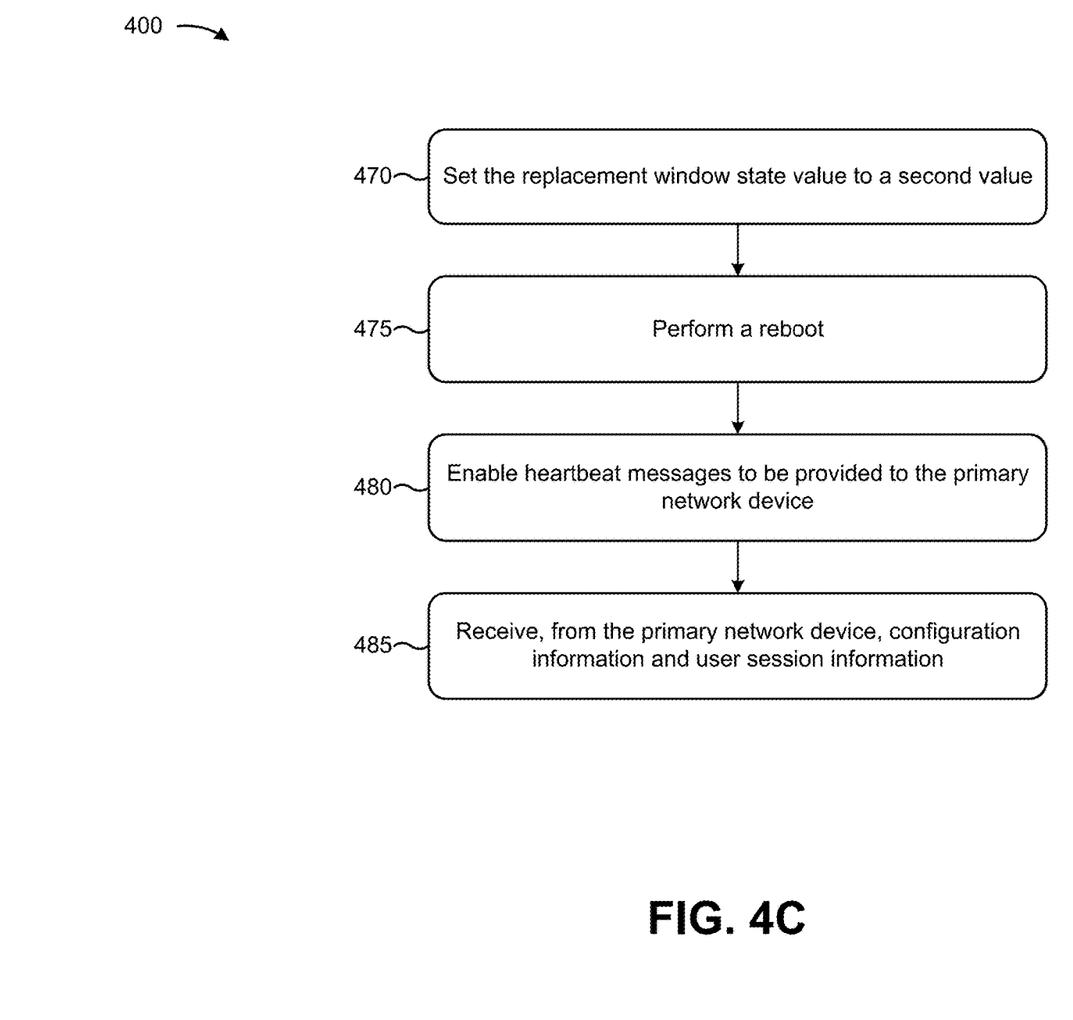

FIGS. 4A-4C are flow charts of an example process 400 for automatically configuring a replacement network device in a high-availability chassis cluster. In some implementations, one or more process blocks of FIGS. 4A-4C may be performed by replacement network device 220. In some implementations, one or more process blocks of FIGS. 4A-4C may be performed by another device or a group of devices separate from or including replacement network device 220, such as primary network device 210 and/or network device 230.

As shown in FIG. 4A, process 400 may include establishing connectivity with a primary network device of a cluster (block 405). For example, replacement network device 220 may establish connectivity with primary network device 210. In some implementations, replacement network device 220 may establish connectivity with primary network device 210 via a wired connection. For example, a network operator may, using a set of networking cables, connect replacement network device 220 and primary network device 210. In some implementations, one or more operations described with regard to FIGS. 4A, 4B, and/or 4C may occur automatically based on primary network device 210 and replacement network device 220 establishing connectivity (e.g., without additional manual network operator input).

In some implementations, primary network device 210 and replacement network device 220 may communicate via one or more links based on establishing connectivity. For example, primary network device 210 and replacement network device 220 may communicate via a control link (e.g., associated with respective control ports). In some implementations, the control link may include a link that enables controller 320 of primary network device 210 to communicate with controller 320 of replacement network device 220. For example, primary network device 210 and replacement network device 220 may transmit session state, configuration, and liveliness signals via the control link. Additionally, or alternatively, primary network device 210 and replacement network device 220 may communicate via a fabric link (e.g., associated with respective Ethernet interfaces).

In some implementations, and as described elsewhere herein, primary network device 210 and replacement network device 220 may form a cluster. For example, a cluster may include a set of devices that are physically connected and configured to provide redundancy and service continuity in the event of a partial or complete device failure (e.g., a hardware failure, a software failure, or the like). In some implementations, replacement network device 220 may operate as a secondary network device based on performing one or more operations, as described herein. In other words, implementations described herein enable replacement network device 220 to automatically be configured to operate as a secondary network device.

As further shown in FIG. 4A, process 400 may include enabling a high-availability multicast listener (block 410), receiving, from the primary network device, a heartbeat message via a control link (block 415), and determining, based on the heartbeat message, information that identifies a cluster identifier and a node identifier (block 420). For example, replacement network device 220 may enable a high-availability multicast listener (e.g., create a multicast socket, and listen for multicast packets), and receive heartbeat messages from primary network device 210 via the control link. In some implementations, replacement network device 220 may enable the high-availability multicast listener to receive multicast packets from primary network device 210 (e.g., heartbeat messages).

Additionally, or alternatively, replacement network device 220 may determine, based on the heartbeat messages, information that identifies a cluster identifier and information that identifies a node identifier of primary network device 210. For example, replacement network device 220 may parse the heartbeat message, and determine information that identifies the cluster identifier and information that identifies the node identifier.

In some implementations, primary network device 210 may provide heartbeat messages via the control link. In this way, replacement network device 220 may detect a failure of primary network device 210 based on heartbeat messages, such as by failing to receive a threshold number of heartbeat messages, or the like. In some implementations, a heartbeat message may include information that identifies a cluster identifier. In some implementations, a cluster identifier may include information that uniquely identifies the cluster. Additionally, or alternatively, a heartbeat message may include information that identifies a node identifier of primary network device 210. In some implementations, a node identifier may include information that identifies a node within a cluster.

In some implementations, replacement network device 220 may determine a node identifier of replacement network device 220 based on the node identifier of primary network device 210. In some implementations, a node identifier value may include a binary value. For example, in situations where the node identifier of primary network device 210 is the value one, then replacement network device 220 may determine a node identifier of replacement network device 220 as the value zero.

As further shown in FIG. 4A, process 400 may include setting a replacement window state value to a first value (block 425). For example, replacement network device 220 may set a replacement window state value to a first value based on determining the information that identifies the cluster identifier and the node identifier of replacement network device 220. In some implementations, a replacement window state may refer to a state of replacement network device 220 where replacement network device 220 performs a set of procedures to ensure software compatibility (e.g., that primary network device 210 and replacement network device 220 include a same operating system version) before performing synchronization of user session data, as described elsewhere herein.

In some implementations, replacement network device 220 may set the replacement window state value to a particular value (e.g., one), thereby indicating that replacement network device 220 is associated with a particular replacement window state. In some implementations, and in situations where replacement network device 220 is in the particular replacement window state, replacement network device 220 may refrain from providing heartbeat messages to primary network device 210. For example, in situations where replacement network device 220 and primary network device 210 include different software versions and replacement network device 220 provides heartbeat messages to primary network device 210, replacement network device 220 may inaccurately advertise that replacement network device 220 is capable of providing failover capability in the event of a failure of primary network device 210.

As further shown in FIG. 4A, process 400 may include performing a reboot (block 430), and entering a high-availability mode (block 435). For example, replacement network device 220 may perform a reboot and enter into a high-availability mode based on setting the replacement window state value. In some implementations, the high-availability mode (or cluster mode) may refer to a mode of operation whereby primary network device 210 and replacement network device 220 are capable of operating as a cluster (e.g., replacement network device 220 can provide failover capability, primary network device 210 and replacement network device 220 operate in concert to provide a network service, or the like).

In some implementations, replacement network device 220 may set one or more bit values that correspond to the cluster identifier and/or node identifier based on determining the cluster identifier and node identifier, as described above in connection with block 415. Additionally, or alternatively, replacement network device 220 may set, in memory, the one or more bit values that correspond to the cluster identifier and/or node identifier. On reboot, the set one or more bit values may cause replacement network device 220 to execute a process (e.g., a redundancy protocol daemon) associated with a redundancy protocol, and enable replacement network device 220 to operate as a cluster member of the cluster.

As shown in FIG. 4B, process 400 may include determining whether the replacement window state value is associated with the first value after entering the high-availability mode (block 440). For example, replacement network device 220 may determine whether the replacement window state value is associated with the first value after rebooting and entering the high-availability mode.

In some implementations, replacement network device 220 may determine the replacement window state value based on reading one or more bit values associated with the replacement window state value from disk. Additionally, or alternatively, replacement network device 220 may determine, based on reading the one or more bit values, whether the replacement window state value is associated with the first value.

As further shown in FIG. 4B, if the replacement window state value is associated with the first value (block 440—YES), then process 400 may include preventing heartbeat messages from being provided to the primary network device, and entering a high-availability hold state (block 445). In some implementations, the high-availability hold state may refer to a state whereby replacement network device 220 prevents heartbeat messages from being provided to primary network device 210.

As further shown in FIG. 4B, process 400 may include obtaining software version information (block 450). For example, replacement network device 220 may obtain, from primary network device 210, software version information. In some implementations, replacement network device 220 may request, from primary network device 210, the information that identifies the software version of primary network device 210. Additionally, or alternatively, primary network device 210 may provide, to replacement network device 220, information that identifies a software version of primary network device 210 (e.g., an operating system version).

As further shown in FIG. 4B, process 400 may include determining whether a first software version of the primary network device and a second software version of the replacement network device are the same (block 455). For example, replacement network device 220 may compare a software version of primary network device 210 and a software version of replacement network device 220 based on the replacement window state being associated with the first value.

As further shown in FIG. 4B, if the first software version is not the same as the second software version (block 455—NO), then process 400 may include obtaining, from the primary network device, information associated with a system image (block 460). For example, if the first software version of primary network device 210 is different than a second software version of replacement network device 220, then replacement network device 220 may obtain information associated with a system image of primary network device 210 (e.g., an operating system image, or the like).

As further shown in FIG. 4B, process 400 may include installing the system image (block 465). For example, replacement network device 220 may install the system image based on obtaining the system image from primary network device 210. In some implementations, primary network device 210 may provide, to replacement network device 220, the information associated with the system image, thereby enabling replacement network device 220 to install, using the system image, an operating system that includes the same version as the operating system of primary network device 210.

As shown in FIG. 4C, if the first software version is the same as the second software version (block 455—YES) or if the replacement network device obtains the information associated with the system image and installs the system image, then process 400 may include setting the replacement window state value to a second value (block 470). For example, replacement network device 220 may set one or more bit values associated with the replacement window state to a second value.

In some implementations, the second value associated with the replacement window state may identify that replacement network device 220 includes the same operating system version as primary network device 210. Additionally, or alternatively, the second value may identify that primary network device 210 and replacement network device 220 are enabled to synchronize configuration information and user session information, as described below.

As further shown in FIG. 4C, if the replacement window state value is not associated with the first value (block 440—NO) or if the replacement network device sets the replacement window state value to the second value, then process 400 may include performing a reboot (block 475). For example, replacement network device 220 may perform a reboot based on the replacement window state value being the second value.

As further shown in FIG. 4C, process 400 may include enabling heartbeat messages to be provided to the primary network device (block 480). For example, replacement network device 220 may enable heartbeat messages to be provided to primary network device 210. In some implementations, replacement network device 220 may exit the high-availability hold state, and provide heartbeat messages to primary network device 210 based on exiting the high-availability hold state.

As further shown in FIG. 4C, process 400 may include receiving, from the primary network device, configuration information and user session information (block 485). For example, replacement network device 220 may receive, from primary network device 210, configuration information and user session information.

In some implementations, configuration information may include information, such as firewall policy information, routing protocol information, route information, metrics associated with one or more packets or one or more flows, or the like. In some implementations, user session information may include information associated with a flow session. For example, a flow session may refer to an entry, in a flow table, that includes information identifying a flow (e.g., a sequence of packets that share some common values, such as five-tuple information), and an action associated with the flow (e.g., permit, deny, log, quarantine, or the like).

In some implementations, primary network device 210 may provide a real-time object (RTO) message. For example, primary network device 210 and replacement network device 220 may synchronize user session information by sending payload packets called RTOs across the fabric link. By transmitting user session information between primary network device 210 and replacement network device 220, RTOs provide consistency and reliability in the event of a failover.

In some implementations, primary network device 210 may provide RTOs for session creation, session modification, and/or session deletion. In some implementations, primary network device 210 may include a set of sessions for a flow. For example, primary network device 210 may include a set of sessions for a flow that correspond to particular interfaces of primary network device 210 (e.g., an incoming interface, an outgoing interface, a parent interface, a loopback interface, or the like). Additionally, or alternatively, primary network device 210 may provide, to replacement network device 220, RTOs that include information associated with the set of sessions associated with the flow.

In some implementations, an RTO may include information that identifies five-tuple information associated with a flow, an interface identifier, a virtual system identifier, a session synchronization identifier, and/or a tunnel identifier. Additionally, or alternatively, an RTO may include information that identifies a sequence (or acknowledgment) identifier, a packet identifier, a byte identifier, or the like.

In this way, replacement network device 220 may perform processing of a flow in the event of a failure of primary network device 210 based on information associated with the RTOs. Additionally, in this way, replacement network device 220 may automatically synchronize user session data with primary network device 210, thereby enabling automatic and immediate processing of user sessions based on a failure of primary network device 210. In other words, replacement network device 220 may operate as a secondary network device based on performing operations associated with FIGS. 4A-4C.

In some implementations, primary network device 210 may experience a hardware failure, a software failure (e.g., a kernel crash, a CPU lock, or the like), an interface failure, a process failure, or the like. Additionally, or alternatively, a message may be logged, an alarm may be raised, or the like, based on any one of the foregoing failures. Additionally, or alternatively, replacement network device 220 may determine, based on failing to receive heartbeat messages, that primary network device 210 has experienced the failure. In this case, replacement network device 220 may perform processing of the network traffic (e.g., may switch a role from backup to primary).

While implementations herein describe replacement network device 220 as providing redundancy capability, other implementations include replacement network device 220 providing other capabilities. For example, replacement network device 220 and primary network device 210 may share responsibility for processing network traffic, and/or may share the performance of particular tasks. That is, primary network device 210 and replacement network device 220 may operate in concert to process network traffic, provide a service, or the like. Implementations described herein enable primary network device 210 and replacement network device 220 to synchronize configuration information and user session information, such that the foregoing capabilities may be achieved.

Although FIGS. 4A-4C show example blocks of process 400, in some implementations, process 400 may include additional blocks, fewer blocks, different blocks, or differently arranged blocks than those depicted in FIGS. 4A-4C. Additionally, or alternatively, two or more of the blocks of process 400 may be performed in parallel.

Implementations described herein enable the automatic configuration of a replacement network device as a replacement for a failed secondary network device. In this way, the replacement network device may reduce the need for manual configuration of the secondary device, reduce errors associated with chassis cluster configuration, reduce an amount of time associated with configuring chassis clusters, or the like relative to situations where a network operator is required to perform manual configuration of the replacement network device.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A replacement network device, comprising:
a memory; and
one or more processors to:
  establish connectivity with a primary network device;
  enable a multicast listener based on establishing connectivity with the primary network device;
  receive, from the primary network device, a multicast packet based on enabling the multicast listener;
  determine, based on the multicast packet, information that identifies a cluster identifier and a node identifier of the replacement network device;
  set a state value to a first value based on determining the information that identifies the cluster identifier and the node identifier of the replacement network device,
    the state value indicating whether the replacement network device is capable of providing a failover capability;
  compare, based on the state value being the first value, a first software version of the primary network device and a second software version of the replacement network device;
  selectively obtain, from the primary network device, information associated with a system image of the primary network device based on comparing the first software version and the second software version;
  set the state value to a second value based on selectively obtaining the information associated with the system image,
    the second value being based on an operating system version of the replacement network device; and
  receive, from the primary network device, configuration information and user session information based on the state value being the second value,
    the replacement network device to provide failover capability based on the configuration information and the user session information.

2. The replacement network device of claim 1, where the one or more processors are further to:
  determine that the first software version is different than the second software version based on comparing the first software version and the second software version; and
  where the one or more processors, when selectively obtaining the information associated with the system image, are to:
    obtain the information associated with the system image to enable the replacement network device to install the system image.

3. The replacement network device of claim 1, where the one or more processors are further to:
  determine that the first software version is a same software version as the second software version based on comparing the first software version and the second software version; and
  where the one or more processors, when selectively obtaining the information associated with the system image, are to:
    prevent a request for information associated with the system image from being sent to the primary network device based on the first software version and the second software version being the same software version.

4. The replacement network device of claim 1, where the one or more processors are further to:
  prevent heartbeat messages from being provided to the primary network device based on determining the information that identifies the cluster identifier and the node identifier.

5. The replacement network device of claim 1, where the one or more processors are further to:
  receive a real-time object message that includes information associated with a user session of the primary network device; and
  where the one or more processors, when receiving the user session information, are to:
    receive the user session information based on the real-time object message.

6. The replacement network device of claim 1, where the one or more processors are further to:
  receive a heartbeat message from the primary network device,
    the heartbeat message including information that identifies the cluster identifier and another node identifier of the primary network device; and
  where the one or more processors, when determining the information that identifies the cluster identifier and the node identifier of the replacement network device, are to:
    determine the information that identifies the cluster identifier and the node identifier of the replacement network device based on the heartbeat message,
    the replacement network device to determine the node identifier of the replacement network device based on the other node identifier of the primary network device.

7. The replacement network device of claim 1, where the one or more processors, when setting the state value to the second value, are to:
  set the state value to the second value based on installing the system image,
    the second value indicating that the replacement network device is capable of synchronizing configuration information and user information with the primary network device.

8. A non-transitory computer-readable medium storing instructions, the instructions comprising:
one or more instructions that, when executed by one or more processors of a replacement network device, cause the one or more processors to:
establish connectivity with a primary network device;
determine, based on establishing connectivity with the primary network device, information that identifies a cluster identifier associated with a high-availability chassis cluster;
set a state value to a first value based on determining the information that identifies the cluster identifier,
the state value indicating whether the replacement network device is capable of providing a failover capability;
compare, based on the state value being the first value, a first software version of the primary network device and a second software version of the replacement network device;
obtain, from the primary network device, information associated with a system image of the primary network device based on comparing the first software version and the second software version;
set the state value to a second value based on obtaining the information associated with the system image,
the second value being based on an operating system version of the replacement network device; and
receive, from the primary network device and based on the state value being the second value, information associated with user sessions after installing the system image,
the replacement network device to form the high-availability chassis cluster with the primary network device and provide failover capability based on the information associated with the user sessions.

9. The non-transitory computer-readable medium of claim 8, where the one or more instructions, when executed by the one or more processors, further cause the one or more processors to:
establish a control link based on establishing connectivity with the primary network device; and
where the one or more instructions, that cause the one or more processors to determine the information that identifies the cluster identifier, cause the one or more processors to:
determine the information that identifies the cluster identifier based on the control link.

10. The non-transitory computer-readable medium of claim 8, where the one or more instructions, when executed by the one or more processors, further cause the one or more processors to:
compare a first software version of the primary network device and a second software version of the replacement network device; and
where the one or more instructions, that cause the one or more processors to obtain the information associated with the system image of the primary network device, cause the one or more processors to:
obtain the information associated with the system image based on comparing the first software version and the second software version,
the first software version being different than the second software version.

11. The non-transitory computer-readable medium of claim 8, where the one or more instructions, when executed by the one or more processors, further cause the one or more processors to:
prevent heartbeat messages from being provided to the primary network device based on establishing connectivity with the primary network device.

12. The non-transitory computer-readable medium of claim 8, where the one or more instructions, when executed by the one or more processors, further cause the one or more processors to:
determine information that identifies a first node identifier of the primary network device;
determine a second node identifier of the replacement network device based on the first node identifier; and
where the one or more instructions, that cause the one or more processors to obtain the information associated with the system image, cause the one or more processors to:
obtain the system image based on the second node identifier.

13. The non-transitory computer-readable medium of claim 8, where the one or more instructions, when executed by the one or more processors, further cause the one or more processors to:
receive, from the primary network device, a set of real-time object messages; and
where the one or more instructions, that cause the one or more processors to receive the information associated with the user sessions, cause the one or more processors to:
receive the information associated with the user sessions based on the set of real-time object messages.

14. The non-transitory computer-readable medium of claim 8, where the one or more instructions, that cause the one or more processors to set the state value to the second value, cause the one or more processors to:
set the state value to the second value based on installing the system image,
the second value indicating that the replacement network device is capable of synchronizing configuration information and user information with the primary network device.

15. A method, comprising:
establishing, by a first network device, connectivity with a second network device;
determining, by the first network device, information that identifies a cluster identifier based on establishing connectivity with the second network device;
setting, by the first network device, a state value to a first value based on determining the information that identifies the cluster identifier,
the state value indicating whether the first network device is capable of providing a failover capability;
comparing, by the first network device, a first software version of the first network device and a second software version of the second network device based on the state value being the first value;
selectively obtaining and installing, by the first network device, a system image of the second network device based on comparing the first software version and the second software version;
setting, by the first network device, the state value to a second value based on selectively obtaining and installing the system image,
the second value being based on an operating system version of the first network device; and receiving, by the first network device and from the second network device, configuration information and user session information based on the state value being the second value,
 the first network device and the second network device to form a high-availability cluster.
16. The method of claim 15, further comprising:
determining that the first software version is different than the second software version; and
where selectively obtaining and installing the system image of the second network device comprises:
 requesting the system image to enable the first network device to install the system image.
17. The method of claim 15, where the first network device prevents heartbeat messages from being provided to the second network device based on setting the state value to the first value.
18. The method of claim 15, further comprising:
receiving, from the second network device, a heartbeat message via a link; and
where determining the information that identifies the cluster identifier comprises:
 determining the information that identifies the cluster identifier based on the heartbeat message.
19. The method of claim 15, further comprising:
determining information that identifies a node identifier of the first network device based on establishing connectivity with the second network device; and
where comparing the first software version of the second network device and the second software version of the first network device comprises:
 comparing the first software version and the second software version based on determining the node identifier of the first network device.
20. The method of claim 15, further comprising:
receiving, from the second network device, real-time object messages; and
where receiving the user session information comprises:
 receiving the user session information based on the real-time object messages.

* * * * *